(12) United States Patent
Gargesha et al.

(10) Patent No.: US 7,123,783 B2
(45) Date of Patent: Oct. 17, 2006

(54) FACE CLASSIFICATION USING CURVATURE-BASED MULTI-SCALE MORPHOLOGY

(75) Inventors: Madhusudhana Gargesha, Tempe, AZ (US); Sethuraman Panchanathan, Gilbert, AZ (US)

(73) Assignee: Arizona State University, Tempe, AZ (US)

( * ) Notice: Subject to any disclaimer, the term of this patent is extended or adjusted under 35 U.S.C. 154(b) by 716 days.

(21) Appl. No.: 10/349,371

(22) Filed: Jan. 21, 2003

(65) Prior Publication Data

US 2003/0147556 A1 Aug. 7, 2003

Related U.S. Application Data

(60) Provisional application No. 60/354,573, filed on Feb. 6, 2002, provisional application No. 60/349,579, filed on Jan. 18, 2002.

(51) Int. Cl.
G06K 9/46 (2006.01)
G06K 9/78 (2006.01)

(52) U.S. Cl. ...................... 382/308; 382/118

(58) Field of Classification Search ............... 382/308, 382/118, 115
See application file for complete search history.

(56) References Cited

U.S. PATENT DOCUMENTS

| | | | |
|---|---|---|---|
| 5,719,951 A * | 2/1998 | Shackleton et al. | 382/118 |
| 5,835,616 A * | 11/1998 | Lobo et al. | 382/118 |
| 2003/0123713 A1* | 7/2003 | Geng | 382/118 |
| 2003/0169906 A1* | 9/2003 | Gokturk et al. | 382/115 |

OTHER PUBLICATIONS

Belhumeur, P., et al., "Eigenfaces vs. fisherfaces: Recognition using class specific linear projection", article, IEEE Transactions on Pattern Analysis and Machine Intelligence vol. 19 No. 7 pp. 711-719 Jul. 1997.

Jackway, P., et a., "Scale-space properties of the multiscale morphological dilation-erosion", article, IEEE Transactions on Pattern Analysis and Machine Intelligence vol. 18 No. 1 pp. 38-51 Jan. 1996.

Koh, L., et al., "An integrated face detection and recognition system", article, International Conference on Image Analysis and Processing, pp. 532-537, 1999.

(Continued)

Primary Examiner—Sanjiv Shah
(74) Attorney, Agent, or Firm—Robert D. Atkins; Quarles & Brady Streich Lang LLP

(57) ABSTRACT

An image classification system uses curvature-based multi-scale morphology to classify an image by its most distinguishing features. The image is recorded in digital form. Curvature features associated with the image are determined. A structuring element is modulated based on the curvature features. The shape of the structuring element is controlled by making it a function of both the scaling factor and the principal curvatures of the intensity surface of the face image. The structuring element modulated with the curvature features is superimposed on the image to determine a feature vector of the image using mathematical morphology. When this Curvature-based Multi-scale Morphology (CMM) technique is applied to face images, a high-dimensional feature vector is obtained. The dimensionality of this feature vector is reduced by using the PCA technique, and the low-dimensional feature vectors are analyzed using an Enhanced FLD Model (EFM) for superior classification performance.

24 Claims, 7 Drawing Sheets

OTHER PUBLICATIONS

Kotropoulos, C., et al., "Frontal face authentication using variants of dynamic link matching based on mathematical morphology", article IEEE Transactions on Image Processing vol. 9 No. 4 Jan. 1998.

Liu, C., et al., "An integrated shape and intensity coding scheme for face recognition", article, International Joint Conference on Neural Networks, vol. 5, pp. 3300-3304, Jun. 1999.

Liu, C., et al., "A Shape-and texture-based enhanced fisher classifier for face recognition", article, IEE Transactions on Image Processing. vol 10, No. 4, pp. 598-608, Apr. 2001.

Nastar, C., et al., "Real-time face recognition using feature combination", article, Third IEEE International Conference on Automatic Face and Gesture Recognition, pp. 312-317, 1998.

Podilchuk, C., et al., "Face recognition using kDCT-based feature vectors", article, IEEE International Conference on Acoustics, Speech, and Signal Processing, vol. 4, pp. 2144-2147 Mar. 1996.

Tanaka, H., et al., "Curvature-based face surface recognition using spherical correlation—Principal directions for curved object recognition", article, Third IEEE International Conference on Automatic Face and Gesture Recognition 0-8186-8344 pp.

Torres, L., et al., "The importance of the color information in face recognition", article, International Conference on Image Processing, vol. 3, pp. 627-631, 1999.

Turk, M., et al., "Face recognition using eigenfaces", article, Journal of Cognitive Neuroscience, vol. 3, No. 1, pp. 71-86, May 1991.

* cited by examiner

FACE CLASSIFICATION USING CURVATURE-BASED MULTI-SCALE MORPHOLOGY

CLAIM TO DOMESTIC PRIORITY

The present non-provisional patent application claims priority to provisional application Ser. No. 60/349,579, entitled "Face Classification Using Curvature-Based Multi-Scale Morphology," filed on Jan. 18, 2002, by Madhusudhana Gargesha et al. The present non-provisional patent application further claims priority to provisional application Ser. No. 60/354,573, entitled "Face Classification Using Curvature-Based Multi-Scale Morphology," filed on Feb. 6, 2002, by Madhusudhana Gargesha et al.

FIELD OF THE INVENTION

The present invention relates, in general, to recognition and classification systems and, more particularly, to a feature recognition and classification system using curvature-based multi-scale morphology.

BACKGROUND OF THE INVENTION

Accurate classification of images or features is an important field of study for a number of commercial applications. For example, the accurate classification of face images is essential for applications that involve automatic face authentication, e.g. for security systems and surveillance applications. The fundamental operation in such applications is face recognition, which involves the computation of similarities between face images. An unknown facial image is scanned, for example, by a security camera, and the unknown image is compared to a database of known images to find a match and identify the subject. The database may contain a number of varying images of the same subject to aid in recognition with different lighting, hair length, aging, facial hair, etc.

A number of approaches for face recognition, suitable for real-time applications, have been used in the prior art. These approaches can be classified as feature-based approaches, data or information-based approaches, such as Principal Components Analysis (PCA), Linear Discriminant Analysis (LDA), Enhanced FLD Model (EFM), and connectionist approaches employing artificial neural networks.

A facial image can be viewed as a two-dimensional collection of individual pixels. A straightforward method for comparing face images would be to compare each pixel of the unknown image to the pixel values of all of the images stored in the database and determine a distance measure based on pixel by pixel comparison. If the image is a monochrome gray-scale, then the distance measure is a comparison of the intensity of each pixel. The difference of each corresponding pixel intensity is measured and the differences are summed to attain a distance measure or a sum of absolute distances. The image with the least or minimum distance measure is the closest match. One drawback with pixel by pixel comparison between the unknown subject and every image in the database is the relatively long processing time needed to find the closest match. The pixel to pixel comparison also become complex if the images are misaligned, offset, or vary in size.

A histogram is another feature based classification method. The histogram separates the image into the number of pixels at varying intensity levels. For example, if the possible intensity levels falls between 0 and 255, then the histogram tracks the number of pixels with intensity levels between 0–5, and the number of pixels with intensity levels between 6–10, and so on up to 255. The histogram can be used to create a plot or distribution. The histogram plot of the unknown image is compared to the histogram plots of known images stored in the database to find the closest match in terms of similar distribution of data. One drawback with the histogram identification approach is that the comparison between plots does not distinguish different features or structure or content of the facial images.

Another technique for frontal face authentication has been proposed that involves extraction of feature vectors by employing multi-scale morphology followed by dimensionality reduction using PCA. This makes the technique both feature-based and data analysis-based. The multi-scale morphology employed in such techniques is performed with regular structuring elements. That is, the same generic structuring element is used at all points on a rectangular grid defined on the image.

DETAILED DESCRIPTION OF THE DRAWINGS

The present classification system uses curvature-based multi-scale morphology (CMM) and modifies the definition of multi-scale morphology by incorporating curvature information from the surface of the image to be identified. The classification system is applicable to identification and classification of the two-dimensional image of any 3-dimensional surface having curvature variations on its surface. For example, the classification system can be used to distinguish and identify a type of vehicle, craft, vessel, or other object. Although the present invention is applicable to many other uses and applications, the classification system will be discussed in terms of human identification and classification by facial recognition.

The curved surface of the face is an important and useful feature for identification purposes. The principal curvatures of the surface of facial images are computed by using a Gaussian derivative filter to obtain a curvature map of the face image. The curvature map determines the shape of structuring elements employed for multi-scale erosion-dilations performed at grid points. The high-dimensional feature vectors that are obtained by this technique are analyzed by PCA and EFM for dimensionality reduction with improved classification performance. Although this technique involves more computations than the standard technique for multiscale morphology, the significant improvement in classification performance outweighs the increase in computational complexity.

Figure 1:
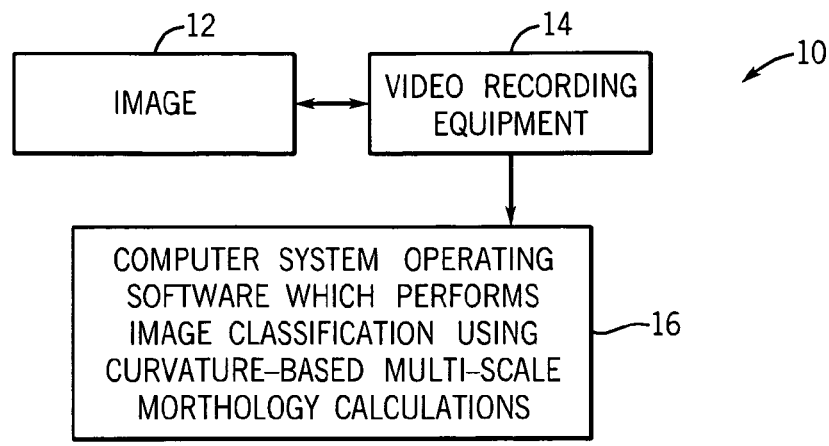
FIG. 1 is a block diagram of an image classification system.

Referring to FIG. 1, classification system 10 is shown. An image 12 is recorded in a numeric format using video recording equipment 14. The numeric format of image 12 can be 112×92 pixels of mono-chrome gray-scale with values from 0–255. For multi-chrome images, three planes (R,G,B) are used with each plane having integer values ranging from 0–255. The recorded image is sent to computer system 16 with standard communication channels and protocol. Computer system 16 operates software to perform image classification using curvature-based multi-scale morphology calculations. Computer system 16 includes a central processing unit, memory, hard disk capacity, and supporting software.

Figure 2:
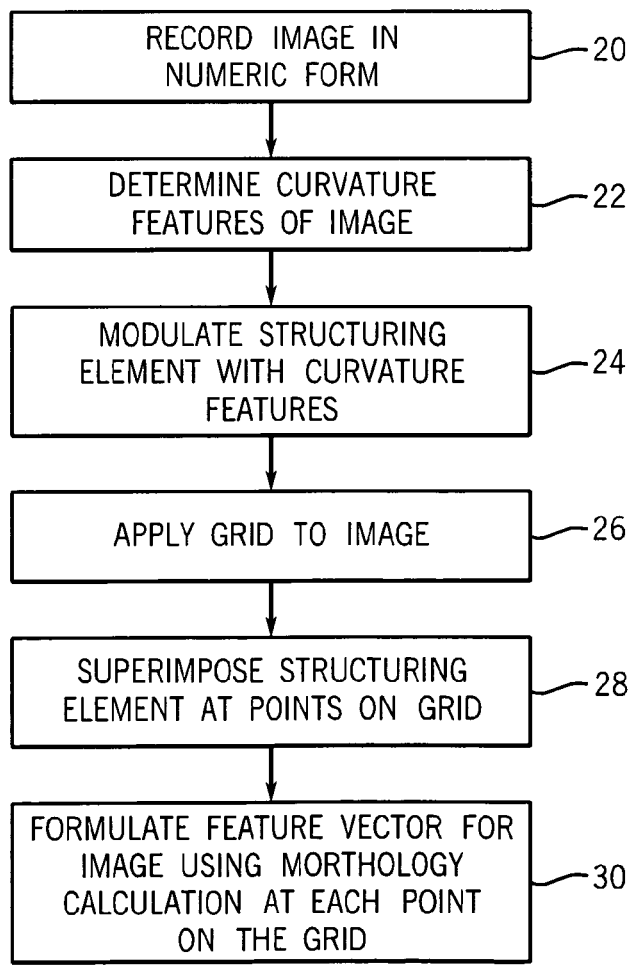
FIG. 2 is a flowchart illustrating the steps to formulate a feature vector for an image.

The steps of the classification process running on computer system 16 will be discussed in more detail below. FIG. 2 is a flowchart of the steps to formulate a feature vector for a given image. In general, step 20 records the image in numeric form. Step 22 determines curvature features of the image. The curvature features of the facial image, such as the nose and ears, have more distinguishing classification data than relatively flat areas like the forehead. The classification process described herein focuses on those areas of the image having the most distinguishing information content. By concentrating on the curvature features of the image, the classification processing becomes more efficient.

In step 24 of FIG. 2, the surface of a pre-defined structuring element, such as a cylinder, is modulated or changed with the curvature features. In step 26, a grid is applied to the image. In step 28, the modulated structuring element is superimposed on each intersection or point of the grid over the image. In step 30, a feature vector for the image is formulated using morphology calculations at each point on the grid.

Figure 3:
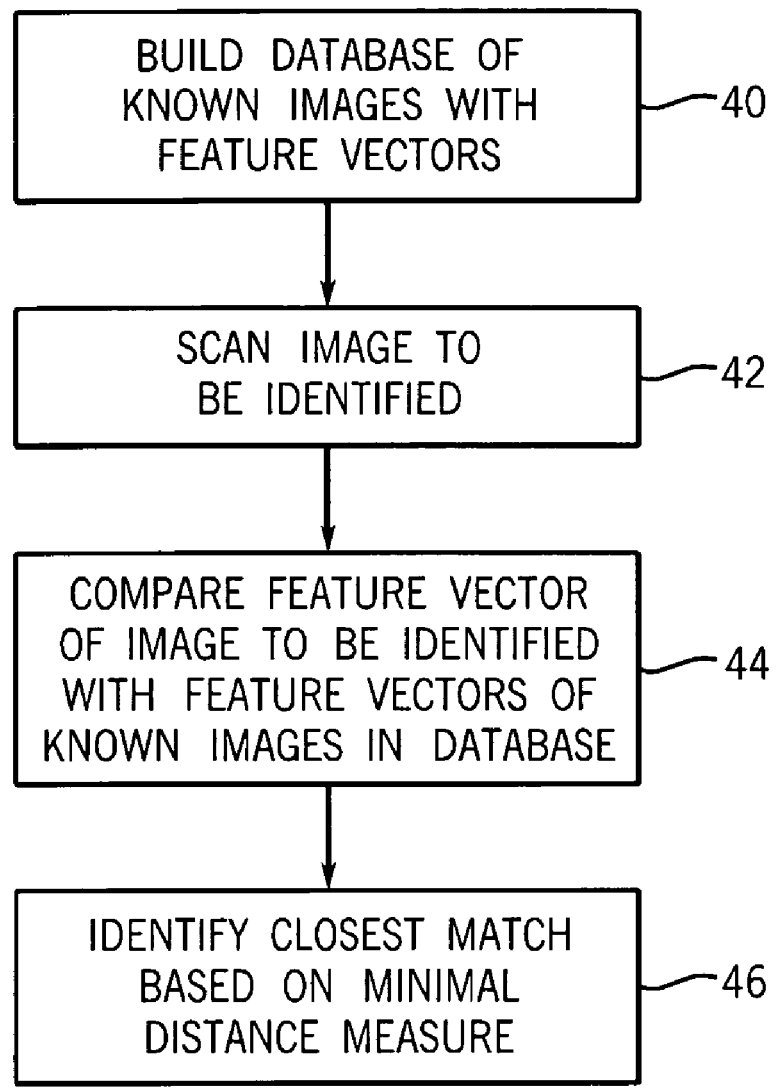
FIG. 3 is a flowchart of the image classification process using the feature vector.

Turning to FIG. 3, the classification process shows step 40 which builds a database of known images with the feature vectors formulated in the steps of FIG. 2. In step 42, the image to be identified is scanned into the classification system. In step 44, the feature vector of the image to be identified is compared to the feature vectors of the known images in the database. In step 46, the closest match between the unknown image and the database is identified based on a minimal distance measure.

Curvature is a geometric property of a surface that characterizes its shape, appearance and the directions in which it could be deformed. There are various types of curvatures, including Gaussian curvature, normal curvature, principal curvatures, and mean curvature. The Gaussian curvature $\xi$ is an intrinsic property of the surface; it is independent of the coordinate system employed to describe the surface. Normal curvature is a property dependent on the direction of the unit normal to a surface at a point. The maximum and minimum values of the normal curvature at a point occur at specific orientations of the plane containing the unit normal, that cuts the surface. These orientations provide the principal directions $h_1$ and $h_2$ and the maximum and minimum values are called the principal curvatures $k_1$ and $k_2$. The mean of the principal curvatures $k_1$ and $k_2$ at a point is called the mean curvature K.

$$K = \frac{1}{2}(k_1 + k_2) \quad (1)$$

The Gaussian curvature $\xi$ is related to the principal curvatures $k_1$ and $k_2$ by the following equation:

$$\xi = k_1 k_2 \quad (2)$$

To determine the principal curvatures $k_1$ and $k_2$ for an intensity image, the principal curvatures at every point in an intensity image are estimated using Gaussian derivative filters. The separable 2-D Gaussian kernel given by equation (3) can be effectively employed for smoothing operations.

$$h(x, y) = g_{2D}(x, y) = \left(\frac{1}{\sqrt{2\pi}\,\sigma}e^{-x^2/2\sigma^2}\right)\left(\frac{1}{\sqrt{2\pi}\,\sigma}e^{-y^2/2\sigma^2}\right) \quad (3)$$

$$= g_{1D}(x) \cdot g_{1D}(y)$$

A practical implementation of Gaussian derivative filtering with the above kernel for images (which are discrete 2-D signals), involves choosing the coefficients of a recursive filter that performs the Gaussian smoothing of the derivatives (gradients) along the two dimensions. The value for $\eta$, a parameter that controls the smoothing operation, is chosen, e.g. $\eta=2$. From this value of $\eta$, the filter coefficients $b_0$, $b_1$, $b_2$, $b_3$ and $b_4$ are calculated as shown by equations (4) and (5).

$$q = \begin{cases} P\eta - Q, \eta \geq 2.5 \\ R - S\sqrt{1 - T\eta}, 0.5 \leq \eta \leq 2.5 \end{cases} \quad (4)$$

$$b_0 = c_0 + c_1 q + c_2 q^2 + c_3 q^3$$

$$b_1 = c_1 q + 2c_2 q^2 + 3c_3 q^3$$

$$b_2 = -c_2 q^2 - 3c_3 q^3$$

$$b_3 = c_3 q^3$$

$$b_4 = 1 - (b_1 + b_2 + b_3)/b_0 \quad (5)$$

The values for P, Q, R, S, T, $c_0, c_1, c_2, c_3$ are determined using recursive filter design techniques. The filter in a separable manner is applied to each row and column. The Gaussian filtered first derivative along each dimension is obtained:

$$w[n] = (b_4/2)(a[n+1] - a[n-1]) + (b_1 w[n-1] + b_2 w[n-2] + b_3 w[n-3])/b_0$$

$$c[n] = b_4 w[n] + (b_1 c[n+1] + b_2 c[n+2] + b_3 c[n+3])/b_0 \quad (6)$$

Here, a[n] denotes the 1-D signal corresponding to each row(column) of the image, w[n] denotes the intermediate signal obtained by applying forward differences and c[n] denotes the output signal obtained by applying backward differences. Similarly, the Gaussian second derivatives can be obtained by applying equation (6) iteratively.

Denoting the intensity image I=f(x,y) by f, the following Gaussian filtered derivatives—$f_x$, $f_y$, $f_{xy}$, $f_{xx}$, $f_{yy}$ are obtained. The subscripts denote the order of the dimension(s) along which the derivatives are computed. From these derivatives, the parameters A,B,C,D,F,G,M,N are estimated by:

$$A = \frac{(f_x f_y f_{xy} - f_{xx}(1 + f_y^2))}{(1 + f_x^2 + f_y^2)^{3/2}}; B = \frac{(f_x f_y f_{xx} - f_{xy}(1 + f_x^2))}{(1 + f_x^2 + f_y^2)^{3/2}} \quad (7)$$

-continued $$C = \frac{(f_x f_y f_{yy} - f_{xy}(1+f_y^2))}{(1+f_x^2+f_y^2)^{3/2}}; D = \frac{(f_x f_y f_{xx} - f_{xy}(1+f_x^2))}{(1+f_x^2+f_y^2)^{3/2}}$$

$$F = f_x f_y; G = 1 + f_y^2$$

$$M = \frac{f_{xy}}{(1+f_x^2+f_y^2)^{1/2}}; N = \frac{f_{yy}}{(1+f_x^2+f_y^2)^{1/2}}$$

The principal directions $h_1$ and $h_2$ are obtained as the roots of the quadratic equation.

$$Ch^2 + (A-D)h - B = 0 \quad (8)$$

The principal curvatures $k_1$ and $k_2$ are then obtained using:

$$k_1 = \frac{M + Nh_1}{F + Gh_1}; k_2 = \frac{M + Nh_2}{F + Gh_2} \quad (9)$$

Based on the values of the principal curvatures $k_1$ and $k_2$ at every point on $f(x,y)$, the different feature points on the face can be distinguished. Of particular interest are the points for which $k_1<0$ and $k_2<0$ where the local shape is convex (peak points) and the points at which $k_1>0$ and $k_2>0$ where the local shape is concave (pit points). The convex points correspond to features like cheeks, eyebrows, bridge of the nose, etc., while the concave points correspond to features like the eye sockets, nostrils, the region between the lips and the chin, etc. In order to obtain the discriminatory features of a face, which consist of both convex and concave points, a suitable thresholding operation can be performed. A binary image can be obtained by considering points for which $\sqrt{k_1^2+k_2^2} \geq \tau$, a threshold value. Such points correspond to features on the face that include both convex and concave points.

Figure 4A:
FIGS. 4a–4c illustrate a facial image and corresponding binary image and curvature map.
Figure 4B:
Figure 4C:

A sample face image and the threshold binary image with $\tau=0.4$ are shown in FIGS. 4a and 4b, respectively. A binary image with curvature threshold $\sqrt{k_1^2+k_2^2} \geq 0.4$ such as the one in FIG. 4b fails to discriminate between the high curvature feature points. A linear mapping of the quantity $\sqrt{k_1^2+k_2^2}$ to the interval [0,255] would be more suitable for obtaining such discriminatory information. A majority of the points within the face image have $0 \leq \sqrt{k_1^2+k_2^2} \leq 1$ with a negligible percentage of the feature points having $\sqrt{k_1^2+k_2^2} \geq 1$, suggesting that these values to 1 could be saturated before performing the mapping from [0,1] to [0,255]. The resulting curvature map $c(x,y)$ is shown in FIG. 4c with the linear grayscale map of $\sqrt{k_1^2+k_2^2}$ obtained after saturation of points exceeding $\sqrt{k_1^2+k_2^2}=1$.

This map resembles an edge image but carries more detailed information in the form of continuous grayscale variations. The shape information from this map could be employed for deriving discriminatory indices for face classification.

In multi-scale morphology applications, scale-space techniques have been employed successfully for image analysis and computer vision. The underlying concept of scale-space is that image features extracted at multiple scales, where the scaling could be applied to the image, filter or structuring element, exhibit a strong relationship with each other as well as with the corresponding feature at zero scale, i.e. with no scaling applied. In other words, the features, when plotted across various scales, lie in a specific path in the "scale-space" This scale-space concept can be easily extended to morphology, which is a useful tool in image analysis. The structuring element in morphological operations is scaled and the resulting features in the morphologically transformed image are analyzed. Features extracted by performing morphological operations at various scales constitute a signature or feature vector for indexing images.

The fundamental operations in mathematical morphology, dilation, and erosion are defined. Denoting the functions, $f: D \subset R^n \rightarrow R$ and $g: G \subset R^n \rightarrow R$, where D and G denote the domains of the respective functions, the following basic morphological operations are defined. The dilation of f(u) by g(u) is denoted by $(f \oplus g)(u)$ and is defined by:

$$(f \oplus g)(u) = \max\{f(u-t)+g(t)|(u-t) \in D, t \in G\} \quad (10)$$

The erosion of f(u) by g(u) is denoted by $(f \ominus g)(u)$ and is defined by:

$$(f \ominus g)(u) = \min\{f(u+t)-g(t)|(u+t) \in D, t \in G\} \quad (11)$$

The following duality exists between erosion and dilation operations:

$$f \ominus g = -((-f) \oplus \hat{g}) \quad (12)$$

where $\hat{g}$ indicates the reflection of g, $$\hat{g}(u) = g(-u) \quad (13)$$

It is computationally simpler to employ structuring elements that are symmetric about the origin so that $\hat{g}=g$. If, in addition, it is desired that there be no level-shifting and horizontal translation effects, equations (14) and (15), respectively, should hold for the structuring elements.

$$\max\{g(u)|u \in G\} = 0 \quad (14)$$

$$g(0) = 0 \quad (15)$$

The structuring element in multi-scale morphology is spatially scaled to yield features at different scales. It is given by:

$$g_\sigma(u) = |\sigma|g(|\sigma|^{-1}u) \; u \in G_\sigma, \sigma \neq 0 \quad (16)$$

where σ is the scale parameter and $G_\sigma = \{u:|\sigma|^{-1}u \in G\}$. The following multi-scale dilation-erosion operation that employs a scaled structuring element has been defined for morphological feature extraction across various scales:

$$(f \otimes g_\sigma)(u) = \begin{cases} (f \oplus g_\sigma)(u) & \text{if } \sigma > 0 \\ f(u) & \text{if } \sigma = 0 \\ (f \ominus g_\sigma)(u) & \text{if } \sigma < 0 \end{cases} \quad (17)$$

In image indexing applications, the multi-scale dilation-erosion operation specified in equation (17) is performed at points on a rectangular grid defined on the image. Structuring elements play an important role in the retrieval performance of indexing and retrieval systems based on filtering and morphology. The shape of the structuring element is a significant aspect that determines the success and error rates of a retrieval system. A variety of structuring elements can be employed that includes "flat" or cylindrical, hemispherical and poweroidal structuring elements.

Figure 5A:
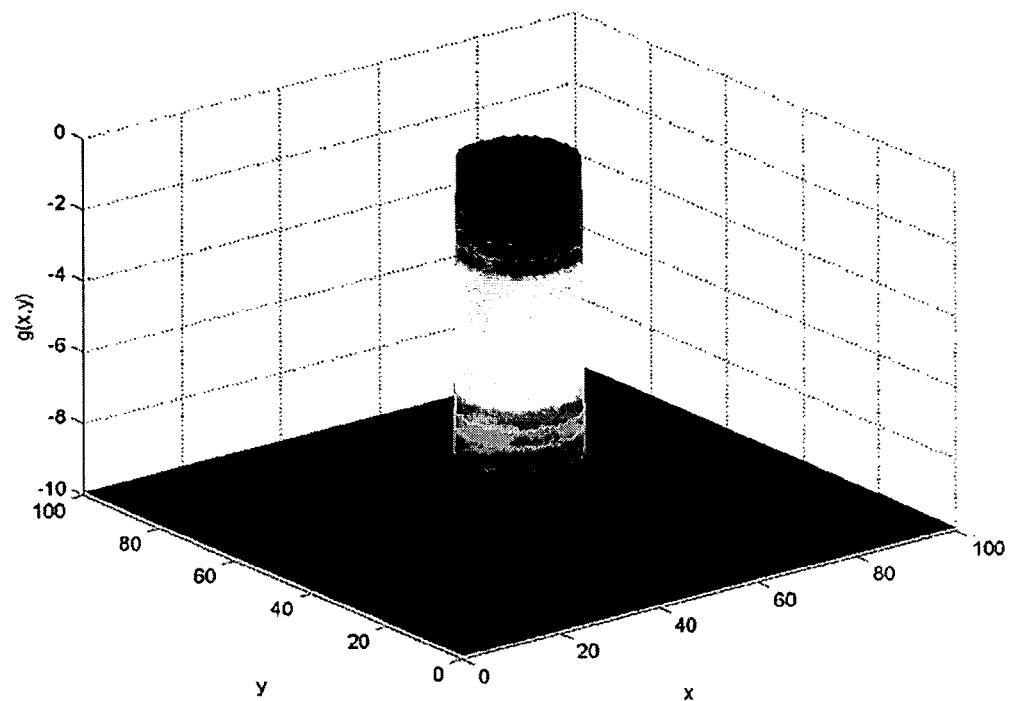
FIGS. 5a–5b illustrates various structuring elements.
Figure 5B:
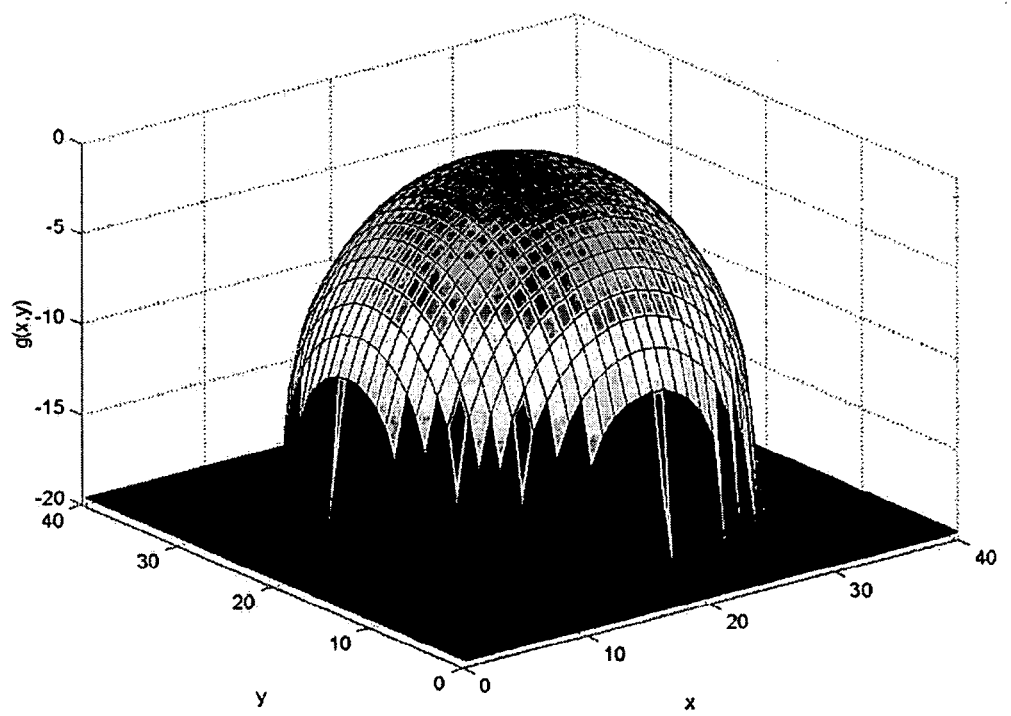

Exemplary structuring elements are shown in FIGS. 5a and 5b. These structuring elements have a regularity or symmetry associated with them at each scale. However, this technique of multi-scale morphology with regular structuring elements is insufficient because it analyzes every point on the image defined by the grid in a similar manner. It does not consider the relative significance of that point in deriving discriminatory information for the image. In other words, regular structuring elements do not take advantage of the fact that certain facial features like the nose have more distinguishing information content than other facial features. Hence, it would be advantageous to have a structuring element whose shape is region-specific; for a particular scale, the spatial extent of the structuring element in the image plane remains the same, however, the shape of the structuring element varies according to the discriminatory information carried by corresponding points in the image with which it overlaps.

For example, a point in the neighborhood of the eyes or nose provides more discriminatory information than a point, say, on the flat part of the forehead. Since curvature captures information that shows the relative significance of points on the face, a structuring element is employed whose shape varies as a function of curvature and the scaling factor. For the purpose of clarity, the structuring element is denoted as a function of the x and y dimensions in the image plane. The curvature-based structuring element $g^c_\sigma(x,y)$ is defined in terms of the scaled structuring element $g_\sigma(x,y)$ and the curvature map $c(x,y)$, see FIG. 4c:

$$g^c_\sigma(x,y) = g_\sigma(x,y) \cdot c(x+X_C, y+Y_C) \quad x,y \in G_\sigma \qquad (18)$$

where $(X_C, Y_C)$ are the coordinates of the center of the structuring element in the image plane. For example, if the cylindrical structuring elements are used, the following equation for $g^c_\sigma(x,y)$ is obtained:

$$g^c_\sigma(x,y) = -|\sigma| \cdot c(x+X_C, y+Y_C), \{x,y | x^2+y^2 \leq \sigma^2\} \qquad (19)$$

Similarly, for a hemispherical structuring elements, equation (20) is obtained:

$$g^c_\sigma(x,y) = -|\sigma|\sqrt{1 - \left(\frac{x}{\sigma}\right)^2 - \left(\frac{y}{\sigma}\right)^2} \cdot c(x+X_c, y+Y_c), \{x,y | x^2+y^2 \leq \sigma^2\} \qquad (20)$$

Figure 6:
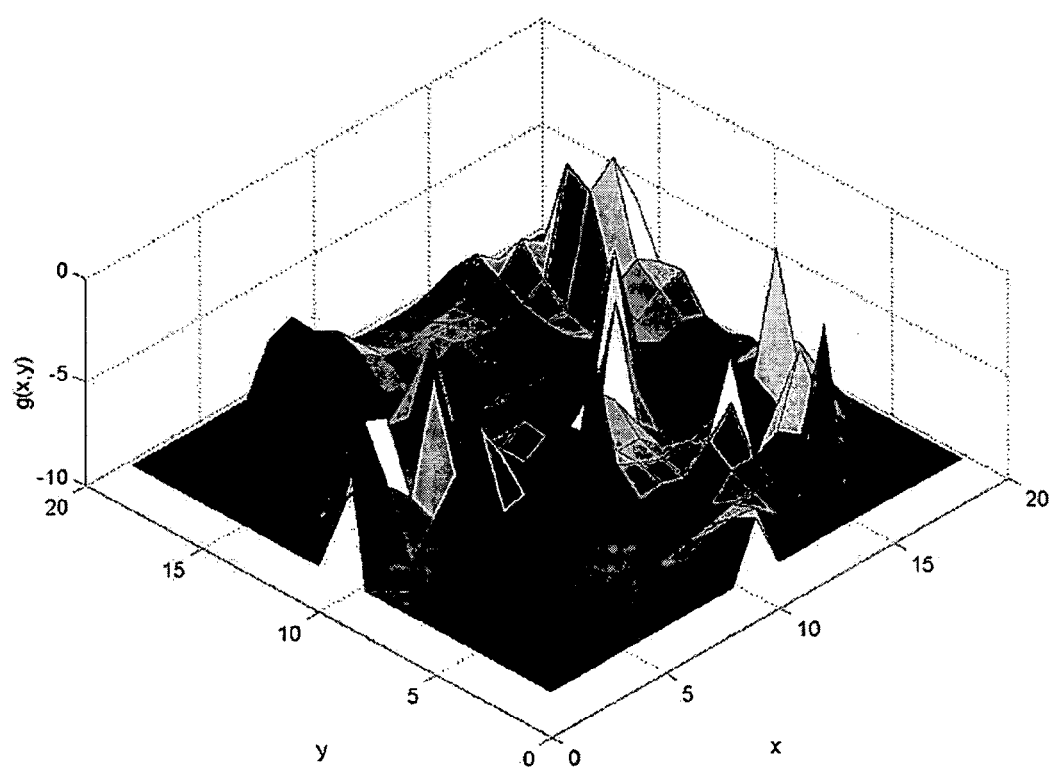
FIG. 6 illustrates a structuring element modulated by a principal curvature map.

In equations (19) and (20), $\sigma$ denotes the scale parameter. The negative sign in equations (19) and (20) is consistent with the requirement specified by equation (14). However, equation (15) does not have to hold for the structuring element that is chosen to make every point, including the origin, dependent on curvature. A typical instance of the curvature-dependent structuring element for a particular grid point and scale is shown in FIG. 6 as compared to regular structuring elements depicted in FIGS. 5a and 5b. FIG. 6 shows the shape of the structuring element at a fixed point P(x,y) on the grid defined on the grayscale facial image shown in FIG. 4a, for scaling factor $\sigma=9$.

The definition for the multi-scale morphological operation can be modified to eliminate the need for a reflection operation of the structuring element about the origin. This would be necessary since the structuring element is no longer symmetric. Also, the reflection operation is needed for dilation. The modified multi-scale erosion-dilation operation is given by:

$$(f * g^c_\sigma)(u) = \begin{cases} (f \oplus \hat{g}^c_\sigma)(u) & \text{if } \sigma > 0 \\ f(u) & \text{if } \sigma = 0 \\ (f \ominus g^c_\sigma)(u) & \text{if } \sigma < 0 \end{cases} \qquad (21)$$

where $\hat{g}^c_\sigma(u) = g^c_\sigma(-u)$ is the reflection about the origin.

The feature vector $\Gamma$ for the face image is formed by arranging the values obtained by multi-scale dilation-erosions given by equation (19) at each grid point across the scales $\{-\sigma_m, -\sigma_{m-1}, \ldots -\sigma_1, 0, \sigma_1, \ldots, \sigma_{m-1}, \sigma_m\}$, where $\sigma_m$ denotes the maximum value of the scaling factor. Denoting the size of the feature vector $\Gamma$ by S as follows:

$$S = (2\sigma_m + 1)mn \qquad (22)$$

where m×n denotes the dimensions of the grid. Such a high-dimensional feature vector representation is redundant and dimensionality reduction techniques like the PCA and classification techniques like the Enhanced Fisher LDA Model can be applied.

The feature vectors extracted by multi-scale morphology in the previous section are analyzed by two techniques—Principal Components Analysis (PCA), which is employed for compact feature representation by reduction of dimensionality of the data, and the Enhanced FLD Model (EFM), which is employed for improved classification performance.

The basis of PCA technique is the Karhunen-Loeve Transform (KLT), which is a data compression technique employed to obtain a lower dimensional representation of data. The PCA technique is applied to the feature vectors obtained by multi-scale morphology discussed above. The PCA approach represents the data in a compact form with negligible reconstruction errors; however, it does not provide good discriminatory power. Therefore, the lower dimensional feature vectors obtained by PCA are analyzed by the Enhanced Fisher Linear Discriminant Model (EFM) for better classification performance.

The PCA method derives the most expressive features (MEF) of the database set and does not model the variation of data between the images in the same class and between the classes. Hence, features derived by employing PCA do not necessarily help in providing a good discrimination performance. The Fisher Linear Discriminant (FLD) method, however, is capable of distinguishing the within- and between-class variations, also known as scatter. The FLD projections thus obtained constitute the most discriminating features (MDF) classification space. The FLD method requires large sample sizes for better generalization. It outperforms PCA in terms of recognition and classification performance when the training images are representative of the range of face variations. The Enhanced FLD model (EFM) improves the generalization capability of FLD. The EFM technique is applied to the reduced-dimensional representation of the feature vectors obtained by PCA.

In comparing the classification performance of the proposed CMM approach with standard multi-scale morphology (SMM), SMM comprises of multi-scale morphology followed by PCA and EFM, while CMM comprises of the proposed method for curvature-based multi-scale morphology followed by PCA and EFM. The intention here is to compare CMM with SMM.

Assume a database of 400 grayscale images of 40 subjects. The dimensions of all the images are 112×92 pixels. There are 10 images of each subject with pose, lighting, scale, and appearance variations within reasonable limits. In a first setup, the "leave-one-out" strategy is adopted in which the training set is formed by selecting all but one of the face images of each of the subjects in the database. The test set consisted of one image of each subject that is left out of the training set. This strategy tests the performance of the classification system when there are adequate samples to train the system.

Figure 7:
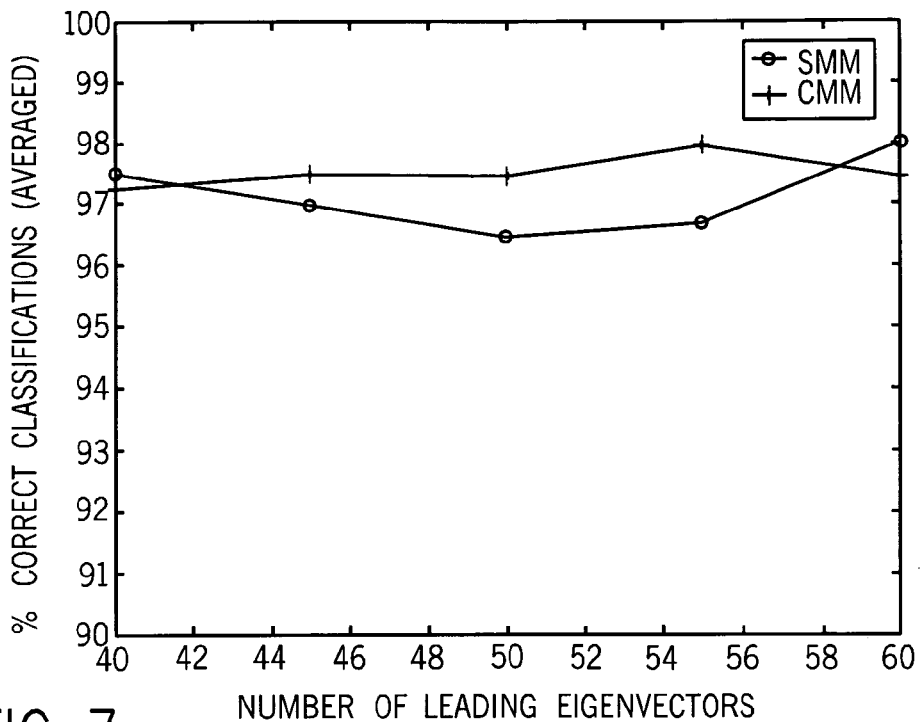
FIG. 7 illustrates a plot of a comparison between SMM and CMM classification techniques.

FIG. 7 shows the classification performance of both techniques for the leave-one-out strategy. FIG. 7 is a plot of percent correct classifications against number of leading Eigenvectors for the SMM and CMM techniques. The classification results for each value of the number of leading Eigenvectors are averaged. From FIG. 7, it is clear that the proposed CMM technique performs better than the standard technique for most cases.

In the second setup, the training set is chosen to have as few images per class as possible. The second setup strategy is adopted to test the ability of the system to learn the distinguishing features between classes when the training samples are very few. The setup comprised of a training set that consisted of 3 out of 10 images for each of the subjects. The training examples for each subject are chosen at random to make up a training set of 120 images. The remaining 280 images, which had 7 images of each of the subjects, are included in the test set. The most significant factor that affects classification performance is the number of leading Eigenvectors M' considered for projection in the PCA technique. Considering more leading Eigenvectors may be redundant, and in some cases, may lead to poor retrieval results.

Figure 8:
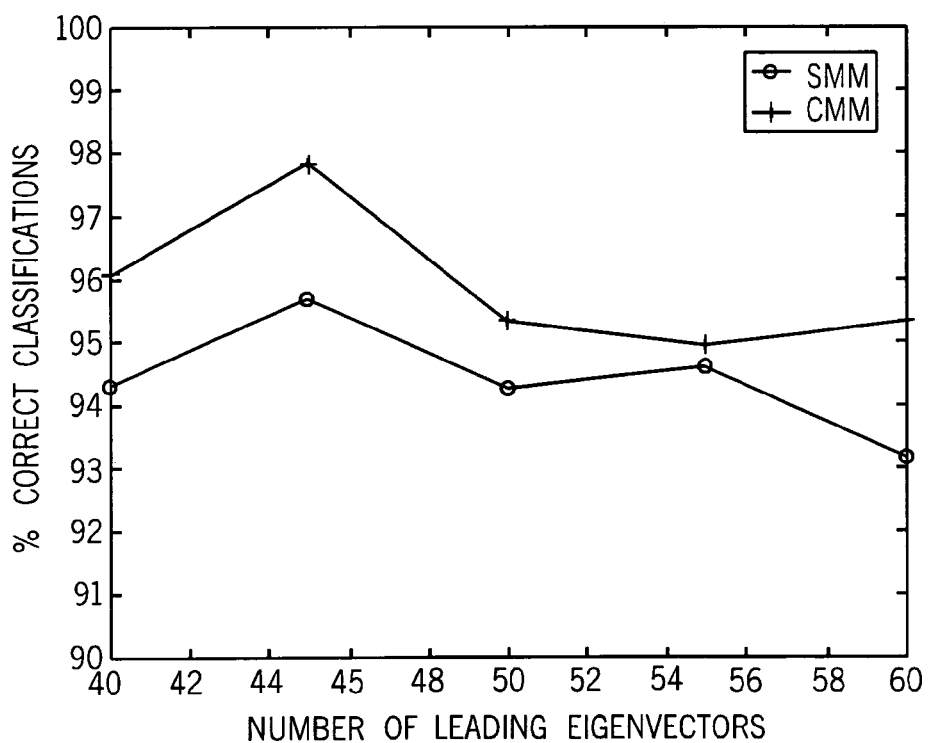
FIG. 8 is a plot of percent correct classifications against number of leading Eigenvectors for the SMM and CMM techniques.

FIG. 8 shows the classification performance of both methods for the second strategy. FIG. 8 is a plot of percent correct classifications against number of leading Eigenvectors for the SMM and CMM techniques using 3 training samples per class. From the plot, it is clear that the proposed CMM technique outperforms the standard technique of multi-scale morphology by a significant margin even in the case where the number of training examples is less.

Figure 9:
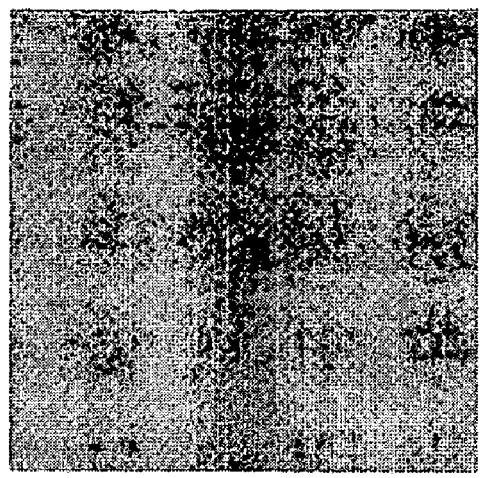
FIG. 9 is a 32×32 pixel image.

FIG. 9 shows the visual results for the CMM technique for M'=45. The best classification performance for CMM of 97.9% is obtained for M'=45, for which SMM showed a classification performance of 95.7%. The mean success rate for the SMM method is 94.4% while that for the CMM method is 95.9%. As expected, considering more leading Eigenvectors lead to a marginal decrease in classification performance for both the methods.

For both setups described above, a 4×5 rectangular grid is defined on the images with a uniform inter-pixel distance $d_g$=18. The value of $\sigma_m$=9 is employed for multi-scale morphology which meant that dilations and erosions are performed at varying scales from 1 to 9. A value of $\eta$=2 is used for the Gaussian filtering approach.

In order to analyze the reason for superior classification performance of CMM, a "rolling-ball" analogy is used. Multi-scale dilation (erosion) can be visualized as being equivalent to a ball of radius determined by the scaling factor, rolling on (below) the intensity surface of the image. The intensity variations in the resulting dilated (eroded) image are obtained by the locus of the center of the ball. In the SMM approach, the radius and hence the size and shape of the ball do not change as it rolls on (below) the intensity surface, for a fixed scale. In the CMM approach, however, the "ball" is no longer a regular shape such as a sphere, instead, it is an irregular object whose shape is controlled by the curvature of the intensity surface as the object rolls on (below) it, for a fixed scale. Therefore, the dilated (eroded) image in the CMM technique captures subtle variations in shape across various scales, which the SMM technique fails to extract. This results in superior classification performance of the CMM approach, as illustrated in FIG. 7.

To aid in understanding the classification system, consider the following example of an implementation for human face recognition. Assume an unknown subject is scanned and record with video equipment 14 using standard communications and protocol, for example by airport security cameras. The security personnel desire to known the identity of the person. The present CMM system can provide that information in an expeditious manner with reasonable certainty.

An important aspect of the classification system is to identify one or more features of the face to be identified which have the most distinguishing information. Thus, an important part of the classification system is identifying which areas of the face that have higher distinguishing information content. In general, areas of the face that have curvature or variation in surface height will have more data than relatively flat areas of the face. The nose, ears, and area around the eyes have more distinguishing data than the forehead and neck. Once those information-rich curved areas are identified and converted to feature vectors then the classification performs a comparison between the feature vector of the image to be identified with feature vectors in the database to find probable matches.

An early step is to select a structuring element. The structuring element can be any shape, e.g. see FIGS. 5a and 5b. For the present explanation, a cylinder is used as the structuring element. Viewed on its end, the cylinder has a flat circular area. Once a base structuring element is selected, the flat surface area can be modulated or changed in accordance with the curvature feature data of the face to arrive at an irregular structuring element, see FIG. 6.

The flat surface of the structuring element is modified or modulated with the curvature information of the face or image. The curvature information can be dependent on the image being analyzed. The curvature information is derived from the image based on intensity or color. For the areas of high curvature, where the curvature information of the face is maximum, e.g. the nose and ears, the image is dark. For the areas of low curvature, where the curvature information of the face is minimal, e.g. the neck and forehead, the image is light.

The face image is a collection of pixels with each pixel having an intensity or luminance value, say 0–255, as defined by the face image. Moving across each line of the image, as the curvature also increases, the gradient or rate of change of intensity from pixel to pixel increases. As the curvature decreases, the gradient or rate of change of intensity from pixel to pixel decreases. For example, moving across one line of the image, adjacent or nearby pixels in the vicinity of the nose will have significantly different intensity or luminance values. If four adjacent or nearby pixels have intensity values of 100, 140, 200, and 250, then the gradient between pixels is 40, 60, and 50. The gradient or rate of change of intensity moving across the pixels is high. The nose is determined to have a high curvature and correspondingly contains significant distinguishing feature information.

Moving across one line of the image, adjacent or nearby pixels in the vicinity of the forehead will have similar intensity or luminance values. If four adjacent or nearby pixels have intensity values of 36, 32, 35, and 37, then the gradient between pixels is −4, 3, and 2. The gradient or rate of change of intensity moving across the pixels is low. The forehead is determined to have a low curvature and correspondingly contains less distinguishing feature information. Thus, the gradient or change in intensity or luminance values moving across each line of the image will define the curvature information.

With this general principal, the equations (1)–(9) and associated text described above provide the technique of detecting curvature and converting that information to the principal curvature at each point of the image using the Gaussian derivative filters. The principal curvature values $k_1$ and $k_2$ are determined for each point on the image and a principal curvature map is derived by using these values.

As further explanation and to provide a specific example of the application of the Gaussian derivative filters to the image to obtain the principal curvature map, consider a 32×32 gray level image as below:

```
128 128 128 128 128 128 128 128 128 128 128  128 128 120 112 104  96 104 112 120 128
128 128 128 128 128 128 128 128 128 128
128 128 128 128 128 128 128 128 128 128 128  128 128 120 112 104  96 104 112 120 128
128 128 128 128 128 128 128 128 128 128
128 128 128 128 128 128 128 128 128 128 128  128 128 120 112 104  96 104 112 120 128
128 128 128 128 128 128 128 128 128 128
128 128 128 128 128 128 128 128 128 128 128  128 128 120 112 104  96 104 112 120 128
128 128 128 128 128 128 128 128 128 128
128 128 128 128 128 128 128 128 128 128 128  128 128 120 112 104  96 104 112 120 128
128 128 128 128 128 128 128 128 128 128
128 128 128 128 128 128 128 128 128 128 128  128 128 120 112 104  96 104 112 120 128
128 128 128 128 128 128 128 128 128 128
128 128 128 128 128 128 128 128 128 128 128  128 128 120 112 104  96 104 112 120 128
128 128 128 128 128 128 128 128 120 128
128 128 128 128 128 128 128 128 128 128 128  128 128 120 112 104  96 104 112 120 128
128 128 128 128 128 128 128 128 128 128
128 128 128 128 128 128 128 128 128 128 128  128 128 120 112 104  96 104 112 120 128
128 128 128 128 128 128 128 128 128 128
128 128 128 128 128 128 128 128 128 128 128  128 128 120 112 104  96 104 112 120 128
128 128 128 128 128 128 128 128 128 128
128 128 128 128 128 128 128 128 128 128 128  128 120 120 112 104  96 104 112 120 128
128 128 128 128 128 128 128 128 128 128
128 128 128 128 128 128 128 128 128 128 128  128 128 120 112 104  96 104 112 120 128
128 128 128 128 128 128 128 128 128 128
128 128 128 128 128 128 128 128 128 128 128  128 128 120 112 104  96 104 112 120 128
128 128 128 128 128 128 128 128 128 128
128 128 128 128 128 128 128 128 128 128 128  128 128 120 112 104  96 104 112 120 128
128 128 128 128 128 128 128 128 128 128
128 128 128 128 128 128 128 128 128 128 128  128 128 120 112 104  96 104 112 120 128
128 128 128 128 128 128 128 128 128 128
128 128 128 128 128 128 128 128 128 128 128  128 128 120 112 104  96 104 112 120 128
128 128 128 128 128 128 128 128 128 128
128 128 128 128 128 128 128 128 128 128 128  128 128 120 112 104  96 104 112 120
128 128 128 128 128 128 128 128 128 128 128
128 128 128 128 128 128 128 128 128 128 128  128 128 120 112 104  96 104 112 120 128
128 128 128 128 128 128 128 128 128 128
128 128 128 128 128 128 128 128 128 128 128  128 128 120 112 104  96 104 112 120 128
128 128 128 128 128 128 128 128 128 128
128 128 128 128 128 128 128 128 128 128 128  128 128 120 112 104  96 104 112 120 128
128 128 128 128 128 128 128 128 128 128 128
```

-continued

| 128 | 128 | 128 | 128 | 128 | 128 | 128 | 128 | 128 | 128 | 128 | 128 | 128 | 120 | 112 | 104 | 96 | 104 | 112 | 120 | 128 |
| 128 | 128 | 128 | 128 | 128 | 128 | 128 | 128 | 128 | 128 | 128 | | | | | | | | | | |

When viewed as an image comprising gray levels between 0–255, the image would appear as shown in FIG. 9. Note that the central portion of the image has a gradual intensity gradient, and the borders are a constant intensity value.

The Gradient derivative and smoothing filter of equations (1)–(9) is applied to calculate the principal curvature at every point in the image. Based on the principal curvature values, a curvature map of the image is derived which highlights both peak and valley points. The curvature map is shown below for the 32×32 matrix with the peak values are highlighted in bold font.

| | | | | | | | | | | | |
|---|---|---|---|---|---|---|---|---|---|---|---|
| 0.0721 | 0.0078 | 0.1069 | 0.1160 | 0.1055 | 0.0841 | 0.0634 | 0.0498 | 0.0443 | 0.0443 | 0.0450 | 0.0411 |
| 0.0289 | 0.0086 | 0.0285 | 0.0812 | 0.1219 | | | | | | | |
| 0.0877 | 0.1043 | 0.1270 | 0.1393 | 0.1275 | 0.1017 | 0.0766 | 0.0602 | 0.0535 | 0.0536 | 0.0549 | 0.0532 |
| 0.0389 | 0.0183 | 0.0249 | 0.0909 | 0.1471 | | | | | | | |
| 0.1063 | 0.1266 | 0.1651 | 0.1981 | 0.1910 | 0.1541 | 0.1162 | 0.0912 | 0.0612 | 0.0818 | 0.0852 | 0.0837 |
| 0.0731 | 0.0547 | 0.0236 | 0.1049 | 0.2220 | | | | | | | |
| 0.1145 | 0.1377 | 0.1964 | 0.2800 | 0.3156 | 0.2688 | 0.2041 | 0.1603 | 0.1434 | 0.1470 | 0.1599 | 0.1690 |
| 0.1636 | 0.1465 | 0.1124 | 0.0981 | 0.3827 | | | | | | | |
| 0.1023 | 0.1238 | 0.1857 | 0.3091 | 0.4643 | 0.4859 | 0.3923 | 0.3156 | 0.2887 | 0.3025 | 0.3294 | 0.3193 |
| 0.2729 | 0.2289 | 0.2113 | 0.2069 | 0.6884 | | | | | | | |
| 0.0780 | 0.0945 | 0.1434 | 0.2516 | 0.4644 | 0.7004 | 0.7118 | 0.6301 | 0.5872 | 0.5653 | 0.4931 | 0.3690 |
| 0.2702 | 0.2130 | 0.2063 | 0.2694 | 1.0770 | | | | | | | |
| 0.0529 | 0.0639 | 0.0971 | 0.1718 | 0.3418 | 0.6710 | 0.0829 | 0.8204 | 0.7456 | 0.6232 | 0.4336 | 0.2809 |
| 0.1952 | 0.1514 | 0.1488 | 0.2139 | 1.2367 | | | | | | | |
| 0.0327 | 0.0395 | 0.0600 | 0.1070 | 0.2321 | 0.5576 | 0.7994 | 0.7610 | 0.6647 | 0.5042 | 0.3003 | 0.1789 |
| 0.1221 | 0.0945 | 0.0935 | 0.1435 | 1.2304 | | | | | | | |
| 0.0188 | 0.0227 | 0.0345 | 0.0638 | 0.1676 | 0.4923 | 0.7394 | 0.6929 | 0.5857 | 0.4140 | 0.2076 | 0.1066 |
| 0.0704 | 0.0544 | 0.0544 | 0.0955 | 1.2116 | | | | | | | |
| 0.0102 | 0.0123 | 0.0190 | 0.0391 | 0.1389 | 0.4672 | 0.7146 | 0.6636 | 0.5517 | 0.3753 | 0.1626 | 0.0645 |
| 0.0385 | 0.0296 | 0.0308 | 0.0711 | 1.2032 | | | | | | | |
| 0.0053 | 0.0065 | 0.0104 | 0.0275 | 0.1290 | 0.4594 | 0.7067 | 0.6541 | 0.5407 | 0.3626 | 0.1462 | 0.0443 |
| 0.0207 | 0.0156 | 0.0182 | 0.0618 | 1.2004 | | | | | | | |
| 0.0027 | 0.0033 | 0.0061 | 0.0233 | 0.1261 | 0.4572 | 0.7045 | 0.6534 | 0.5376 | 0.3590 | 0.1413 | 0.0368 |
| 0.0116 | 0.0082 | 0.0127 | 0.0590 | 1.1998 | | | | | | | |
| 0.0014 | 0.0018 | 0.0043 | 0.0221 | 0.1254 | 0.4566 | 0.7039 | 0.6507 | 0.5368 | 0.3580 | 0.1400 | 0.0346 |
| 0.0077 | 0.0046 | 0.0108 | 0.0582 | 1.1995 | | | | | | | |
| 0.0007 | 0.0010 | 0.0037 | 0.0217 | 0.1252 | 0.4564 | 0.7038 | 0.6506 | 0.5366 | 0.3578 | 0.1397 | 0.0340 |
| 0.0062 | 0.0031 | 0.0103 | 0.0580 | 1.1995 | | | | | | | |
| 0.0004 | 0.0007 | 0.0036 | 0.0216 | 0.1251 | 0.4564 | 0.7037 | 0.6505 | 0.5365 | 0.3577 | 0.1396 | 0.0338 |
| 0.0058 | 0.0025 | 0.0101 | 0.0579 | 1.1995 | | | | | | | |
| 0.0003 | 0.0006 | 0.0035 | 0.0216 | 0.1251 | 0.4564 | 0.7037 | 0.6505 | 0.5365 | 0.3577 | 0.1396 | 0.0338 |
| 0.0057 | 0.0023 | 0.0101 | 0.0579 | 1.1995 | | | | | | | |
| 0.0002 | 0.0006 | 0.0035 | 0.0216 | 0.1251 | 0.4564 | 0.7037 | 0.6505 | 0.5365 | 0.3577 | 0.1396 | 0.0337 |
| 0.0056 | 0.0023 | 0.0101 | 0.0579 | 1.1995 | | | | | | | |
| 0.0002 | 0.0006 | 0.0035 | 0.0216 | 0.1251 | 0.4564 | 0.7037 | 0.6505 | 0.5365 | 0.3577 | 0.1396 | 0.0338 |
| 0.0057 | 0.0023 | 0.0101 | 0.0579 | 1.1995 | | | | | | | |
| 0.0004 | 0.0007 | 0.0036 | 0.0216 | 0.1251 | 0.4564 | 0.7037 | 0.6505 | 0.5365 | 0.3577 | 0.1396 | 0.0338 |
| 0.0058 | 0.0025 | 0.0101 | 0.0579 | 1.1995 | | | | | | | |
| 0.0007 | 0.0010 | 0.0037 | 0.0217 | 0.1252 | 0.4564 | 0.7038 | 0.6506 | 0.5366 | 0.3578 | 0.1397 | 0.0340 |
| 0.0062 | 0.0031 | 0.0103 | 0.0580 | 1.1995 | | | | | | | |
| 0.0014 | 0.0018 | 0.0043 | 0.0221 | 0.1254 | 0.4566 | 0.7039 | 0.6507 | 0.5368 | 0.3580 | 0.1400 | 0.0346 |
| 0.0077 | 0.0046 | 0.0108 | 0.0582 | 1.1996 | | | | | | | |
| 0.0027 | 0.0033 | 0.0061 | 0.0233 | 0.1261 | 0.4572 | 0.7045 | 0.6514 | 0.5376 | 0.3590 | 0.1413 | 0.0368 |
| 0.0116 | 0.0082 | 0.0127 | 0.0590 | 1.1996 | | | | | | | |
| 0.0051 | 0.0062 | 0.0100 | 0.0271 | 0.1287 | 0.4591 | 0.7065 | 0.6538 | 0.5404 | 0.3622 | 0.1457 | 0.0436 |
| 0.0199 | 0.0150 | 0.0177 | 0.0615 | 1.2004 | | | | | | | |
| 0.0051 | 0.0111 | 0.0171 | 0.0364 | 0.1364 | 0.4652 | 0.7124 | 0.6608 | 0.5486 | 0.3719 | 0.1504 | 0.0597 |
| 0.0347 | 0.0266 | 0.0280 | 0.0688 | 1.2023 | | | | | | | |
| 0.0153 | 0.0185 | 0.0282 | 0.0536 | 0.1552 | 0.4811 | 0.7262 | 0.6769 | 0.5681 | 0.3957 | 0.1878 | 0.0891 |
| 0.0574 | 0.0443 | 0.0447 | 0.0847 | 1.2056 | | | | | | | |
| 0.0235 | 0.0284 | 0.0432 | 0.0790 | 0.1917 | 0.5141 | 0.7442 | 0.6952 | 0.5949 | 0.4364 | 0.2378 | 0.1310 |
| 0.0877 | 0.0677 | 0.0672 | 0.1100 | 1.2028 | | | | | | | |
| 0.0324 | 0.0393 | 0.0601 | 0.1009 | 0.2481 | 0.5566 | 0.7153 | 0.6509 | 0.5699 | 0.4571 | 0.2910 | 0.1754 |
| 0.1193 | 0.0919 | 0.0899 | 0.1347 | 1.1487 | | | | | | | |
| 0.0394 | 0.0481 | 0.0747 | 0.1414 | 0.3115 | 0.5417 | 0.5587 | 0.4733 | 0.4194 | 0.3780 | 0.2923 | 0.1955 |
| 0.1357 | 0.1043 | 0.0982 | 0.1314 | 0.9532 | | | | | | | |
| 0.0413 | 0.0512 | 0.0828 | 0.1667 | 0.3328 | 0.4240 | 0.3673 | 0.2858 | 0.2621 | 0.2518 | 0.2247 | 0.1679 |
| 0.1184 | 0.0887 | 0.0736 | 0.0998 | 0.6704 | | | | | | | |
| 0.0368 | 0.0478 | 0.0839 | 0.1764 | 0.2944 | 0.3054 | 0.2458 | 0.1950 | 0.1728 | 0.1690 | 0.1589 | 0.1241 |
| 0.0822 | 0.0521 | 0.0305 | 0.1201 | 0.4625 | | | | | | | |
| 0.0276 | 0.0389 | 0.0773 | 0.1691 | 0.2572 | 0.2488 | 0.1965 | 0.1555 | 0.1378 | 0.1351 | 0.1280 | 0.0989 |

-continued

| | | | | | | | | | | | |
|---|---|---|---|---|---|---|---|---|---|---|---|
| 0.0577 | 0.0238 | 0.0265 | 0.1411 | 0.3733 | | | | | | | |
| 0.0121 | 0.0195 | 0.0487 | 0.1400 | 0.2692 | 0.2914 | 0.2374 | 0.1889 | 0.1669 | 0.1608 | 0.1434 | 0.0959 |
| 0.0431 | 0.0084 | 0.0321 | 0.1469 | 0.4492 | | | | | | | |
| 0.0812 | 0.0285 | 0.0086 | 0.0289 | 0.0410 | 0.0448 | 0.0432 | 0.0408 | 0.0405 | 0.0429 | 0.0454 | 0.0444 |
| 0.0383 | 0.0282 | 0.0123 | | | | | | | | | |
| 0.0909 | 0.0249 | 0.0183 | 0.0389 | 0.0512 | 0.0546 | 0.0524 | 0.0493 | 0.0490 | 0.0519 | 0.0552 | 0.0548 |
| 0.0494 | 0.0396 | 0.0197 | | | | | | | | | |
| 0.1050 | 0.0236 | 0.0547 | 0.0732 | 0.0837 | 0.0849 | 0.0799 | 0.0748 | 0.0743 | 0.0790 | 0.0851 | 0.0878 |
| 0.0858 | 0.0777 | 0.0487 | | | | | | | | | |
| 0.0981 | 0.1124 | 0.1465 | 0.1636 | 0.1690 | 0.1593 | 0.1437 | 0.1323 | 0.1312 | 0.1410 | 0.1571 | 0.1722 |
| 0.1766 | 0.1675 | 0.1381 | | | | | | | | | |
| 0.2069 | 0.2113 | 0.2289 | 0.2729 | 0.3193 | 0.3287 | 0.2974 | 0.2700 | 0.2669 | 0.2893 | 0.3249 | 0.3298 |
| 0.2868 | 0.2494 | 0.2602 | | | | | | | | | |
| 0.2694 | 0.2063 | 0.2130 | 0.2702 | 0.3689 | 0.4926 | 0.5607 | 0.5650 | 0.5649 | 0.5682 | 0.5218 | 0.3978 |
| 0.2838 | 0.2306 | 0.2693 | | | | | | | | | |
| 0.2139 | 0.1487 | 0.1514 | 0.1952 | 0.2808 | 0.4333 | 0.6201 | 0.7234 | 0.7379 | 0.6701 | 0.4869 | 0.3087 |
| 0.2049 | 0.1636 | 0.1970 | | | | | | | | | |
| 0.1435 | 0.0935 | 0.0945 | 0.1221 | 0.1788 | 0.3000 | 0.5005 | 0.6378 | 0.6585 | 0.5640 | 0.3517 | 0.1988 |
| 0.1283 | 0.1019 | 0.1236 | | | | | | | | | |
| 0.0955 | 0.0544 | 0.0544 | 0.0704 | 0.1066 | 0.2071 | 0.4091 | 0.5538 | 0.5761 | 0.4764 | 0.2575 | 0.1214 |
| 0.0742 | 0.0586 | 0.0712 | | | | | | | | | |
| 0.0711 | 0.0308 | 0.0296 | 0.0385 | 0.0644 | 0.1620 | 0.3697 | 0.5174 | 0.5402 | 0.4389 | 0.2142 | 0.0779 |
| 0.0413 | 0.0319 | 0.0387 | | | | | | | | | |
| 0.0618 | 0.0182 | 0.0156 | 0.0207 | 0.0443 | 0.1456 | 0.3567 | 0.5055 | 0.5284 | 0.4266 | 0.1992 | 0.0586 |
| 0.0233 | 0.0168 | 0.0202 | | | | | | | | | |
| 0.0590 | 0.0127 | 0.0082 | 0.0116 | 0.0368 | 0.1407 | 0.3530 | 0.5021 | 0.5251 | 0.4231 | 0.1948 | 0.0520 |
| 0.0149 | 0.0088 | 0.0104 | | | | | | | | | |
| 0.0582 | 0.0108 | 0.0046 | 0.0077 | 0.0345 | 0.1394 | 0.3520 | 0.5013 | 0.5243 | 0.4222 | 0.1937 | 0.0501 |
| 0.0118 | 0.0049 | 0.0053 | | | | | | | | | |
| 0.0580 | 0.0103 | 0.0031 | 0.0062 | 0.0339 | 0.1390 | 0.3518 | 0.5010 | 0.5240 | 0.4220 | 0.1934 | 0.0496 |
| 0.0108 | 0.0032 | 0.0028 | | | | | | | | | |
| 0.0579 | 0.0101 | 0.0025 | 0.0058 | 0.0338 | 0.1389 | 0.3517 | 0.5010 | 0.5240 | 0.4219 | 0.1933 | 0.0495 |
| 0.0105 | 0.0026 | 0.0016 | | | | | | | | | |
| 0.0579 | 0.0101 | 0.0023 | 0.0057 | 0.0337 | 0.1389 | 0.3517 | 0.5010 | 0.5240 | 0.4219 | 0.1933 | 0.0495 |
| 0.0104 | 0.0024 | 0.0010 | | | | | | | | | |
| 0.0579 | 0.0101 | 0.0023 | 0.0056 | 0.0337 | 0.1389 | 0.3517 | 0.5010 | 0.5239 | 0.4219 | 0.1933 | 0.0495 |
| 0.0104 | 0.0023 | 0.0008 | | | | | | | | | |
| 0.0579 | 0.0101 | 0.0023 | 0.0057 | 0.0337 | 0.1389 | 0.3517 | 0.5010 | 0.5240 | 0.4219 | 0.1933 | 0.0495 |
| 0.0104 | 0.0024 | 0.0009 | | | | | | | | | |
| 0.0579 | 0.0101 | 0.0025 | 0.0058 | 0.0338 | 0.1389 | 0.3517 | 0.5010 | 0.5240 | 0.4219 | 0.1933 | 0.0495 |
| 0.0105 | 0.0025 | 0.0015 | | | | | | | | | |
| 0.0580 | 0.0103 | 0.0031 | 0.0062 | 0.0339 | 0.1390 | 0.3518 | 0.5010 | 0.5240 | 0.4220 | 0.1934 | 0.0496 |
| 0.0108 | 0.0032 | 0.0028 | | | | | | | | | |
| 0.0582 | 0.0108 | 0.0046 | 0.0077 | 0.0345 | 0.1394 | 0.3520 | 0.5013 | 0.5243 | 0.4222 | 0.1937 | 0.0501 |
| 0.0118 | 0.0049 | 0.0054 | | | | | | | | | |
| 0.0590 | 0.0127 | 0.0082 | 0.0116 | 0.0368 | 0.1407 | 0.3530 | 0.5021 | 0.5251 | 0.4231 | 0.1948 | 0.0520 |
| 0.0149 | 0.0088 | 0.0103 | | | | | | | | | |
| 0.0615 | 0.0177 | 0.0150 | 0.0199 | 0.0435 | 0.1451 | 0.3563 | 0.5051 | 0.5281 | 0.4262 | 0.1988 | 0.0580 |
| 0.0226 | 0.0161 | 0.0194 | | | | | | | | | |
| 0.0688 | 0.0280 | 0.0266 | 0.0347 | 0.0597 | 0.1579 | 0.3662 | 0.5141 | 0.5369 | 0.4355 | 0.2104 | 0.0733 |
| 0.0373 | 0.0287 | 0.0347 | | | | | | | | | |
| 0.0847 | 0.0447 | 0.0443 | 0.0574 | 0.0891 | 0.1873 | 0.3904 | 0.5351 | 0.5574 | 0.4581 | 0.2381 | 0.1031 |
| 0.0608 | 0.0478 | 0.0579 | | | | | | | | | |
| 0.1100 | 0.0672 | 0.0677 | 0.0877 | 0.1309 | 0.2374 | 0.4317 | 0.5645 | 0.5846 | 0.4942 | 0.2871 | 0.1475 |
| 0.0924 | 0.0731 | 0.0885 | | | | | | | | | |
| 0.1347 | 0.0899 | 0.0919 | 0.1192 | 0.1753 | 0.2905 | 0.4522 | 0.5414 | 0.5541 | 0.4974 | 0.3365 | 0.1955 |
| 0.1260 | 0.0999 | 0.1193 | | | | | | | | | |
| 0.1314 | 0.0982 | 0.1043 | 0.1357 | 0.1954 | 0.2916 | 0.3721 | 0.3930 | 0.3957 | 0.3883 | 0.3217 | 0.2164 |
| 0.1451 | 0.1154 | 0.1315 | | | | | | | | | |
| 0.0999 | 0.0736 | 0.0887 | 0.1184 | 0.1678 | 0.2239 | 0.2466 | 0.2425 | 0.2422 | 0.2497 | 0.2373 | 0.1812 |
| 0.1315 | 0.1042 | 0.1045 | | | | | | | | | |
| 0.1201 | 0.0305 | 0.0521 | 0.0823 | 0.1241 | 0.1582 | 0.1652 | 0.1594 | 0.1589 | 0.1658 | 0.1651 | 0.1380 |
| 0.0987 | 0.0736 | 0.0591 | | | | | | | | | |
| 0.1411 | 0.0265 | 0.0238 | 0.0577 | 0.0989 | 0.1274 | 0.1320 | 0.1270 | 0.1266 | 0.1323 | 0.1327 | 0.1114 |
| 0.0755 | 0.0494 | 0.0314 | | | | | | | | | |
| 0.1469 | 0.0321 | 0.0084 | 0.0431 | 0.0958 | 0.1428 | 0.1571 | 0.1540 | 0.1538 | 0.1589 | 0.1522 | 0.1128 |
| 0.0614 | 0.0318 | 0.0182 | | | | | | | | | |

Figure 10:
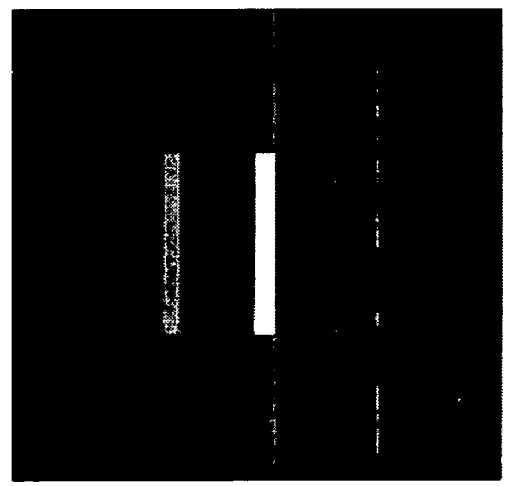
FIG. 10 is the curvature map of the image in FIG. 9 following gradient derivative and filter smoothing.

The top, bottom, left and right boundaries of about 8–10 pixel width can be disregarded because curvature cannot be estimated with confidence for these border pixels. These values are set to zero and viewed the image with a linear mapping of fractional values in [0,1] to integer values in [0,255] with values greater than 1 being saturated to 255, as shown in FIG. 10. A clear peak in curvature values is seen in the middle of the image where there is an intensity gradient while the borders of the image show low (essentially zero) values because the intensity is constant in the example above.

Using an image having m×n pixels, in our example, m=112 and n=92, and based on the above curvature processing, the principal curvature $k_1$ and $k_2$ are determined for each pixel. A grid is then superimposed over the image. The structuring element is aligned with each intersection of the grid over the image. The size of the grid is selected, with consideration of the size of the structuring element, to make sure the important feature elements of the image fall within one or more structuring element overlays on the grid. For the 112×92 pixel image, a grid is selected with inter-pixel distance of 18 pixels, yielding a 4×5 grid having 20 points on it.

The structuring element is placed on each intersection of the grid. The height of the structuring element is modulated by the principal curvature values as described in paragraphs [24]–[25] above. An morphology calculation, as defined in equations (10)–(22) and associated text, is derived from the principal curvature map is applied to the image. The morphology calculation is performed for each pixel. In an alternate embodiment, the radius of the structuring element is incrementally increased for each morphology calculation, for example from a starting radius of 1 pixel and incremented by 1 each calculation to a maximum radius of 9 pixels. In yet another embodiment, all morphology calculations can be performed for one radius over the entire image and then the radius increased and the calculation repeated.

The morphology calculation after obtaining the principal curvature map may be explained with an example. Consider a 7×7 region in the image which has the following intensity values:

| 120 | 112 | 104 | 96 | 104 | 112 | 120 |
|-----|-----|-----|----|-----|-----|-----|
| 120 | 112 | 104 | 96 | 104 | 112 | 120 |
| 120 | 112 | 104 | 96 | 104 | 112 | 120 |
| 120 | 112 | 104 | 96 | 104 | 112 | 120 |
| 120 | 112 | 104 | 96 | 104 | 112 | 120 |
| 120 | 112 | 104 | 96 | 104 | 112 | 120 |
| 120 | 112 | 104 | 96 | 104 | 112 | 120 |

Assume that a cylindrical structuring element of radius 2 is placed on the center pixel of this region which has the coordinates (4,4) in a one-based indexing system. The (4,4) pixel has been highlighted in bold in the above matrix. The span of the structuring element for the 7×7 region is shown in the matrix below. The x's denote the image pixels with which the structuring element pixels overlap, while the +'s denote the image pixels with which the structuring element pixels don't overlap.

| + | + | + | + | + | + | + |
|---|---|---|---|---|---|---|
| + | + | + | x | + | + | + |
| + | + | x | x | x | + | + |
| + | x | x | x | x | x | + |
| + | + | x | x | x | + | + |
| + | + | + | x | + | + | + |
| + | + | + | + | + | + | + |

Now that the shape of the structuring element is known, a cylindrical structuring element of radius 2 is generated with the actual pixel values. A typical structuring element will have its height equal to the radius of its base, so that the following values are obtained:

| + | + | + | + | + | + | + |
|---|---|---|---|---|---|---|
| + | + | + | 2 | + | + | + |
| + | + | 2 | 2 | 2 | + | + |
| + | 2 | 2 | 2 | 2 | 2 | + |
| + | + | 2 | 2 | 2 | + | + |
| + | + | + | 2 | + | + | + |
| + | + | + | + | + | + | + |

The curvature map for the pixels in the same 7×7 region in the image looks like the data below with the bold values indicating the curvature values used to modulate the structuring element values.

| 0.7994 | 0.7610 | 0.6647 | 0.5042 | 0.3003 | 0.1789 |
|--------|--------|--------|--------|--------|--------|
| 0.1221 | | | | | |
| 0.7394 | 0.6929 | 0.5857 | 0.4140 | 0.2076 | 0.1066 |
| 0.0704 | | | | | |
| 0.7146 | 0.6636 | 0.5517 | 0.3753 | 0.1626 | 0.0645 |
| 0.0385 | | | | | |
| 0.7067 | 0.6541 | 0.5407 | 0.3626 | 0.1462 | 0.0443 |
| 0.0207 | | | | | |
| 0.7045 | 0.6514 | 0.5376 | 0.3590 | 0.1413 | 0.0368 |
| 0.0116 | | | | | |
| 0.7039 | 0.6507 | 0.5368 | 0.3580 | 0.1400 | 0.0346 |
| 0.0077 | | | | | |
| 0.7038 | 0.6506 | 0.5366 | 0.3578 | 0.1397 | 0.0340 |
| 0.0062 | | | | | |

If the structuring element values are modulated with the curvature values, then the modulated structuring element would be as below, obtained by multiplying the height of the structuring element pixel by the curvature value:

| 0 | 0 | 0 | 0 | 0 | 0 |
|---|---|---|---|---|---|
| 0 | | | | | |
| 0 | 0 | 0 | 0.8280 | 0 | 0 |
| 0 | | | | | |
| 0 | 0 | 1.1034 | 0.7506 | 0.3252 | 0 |
| 0 | | | | | |
| 0 | 1.3082 | 1.0814 | 0.7252 | 0.2924 | 0.0886 |
| 0 | | | | | |
| 0 | 0 | 1.0752 | 0.7180 | 0.2826 | 0 |
| 0 | | | | | |
| 0 | 0 | 0 | 0.7160 | 0 | 0 |
| 0 | | | | | |
| 0 | 0 | 0 | 0 | 0 | 0 |
| 0 | | | | | |

A dilation is performed on the image at the chosen point (4,4) for the chosen scale with radius=2. Dilation involves (1) subtracting the structuring element values from the image pixel values, and (2) taking the maximum of the resulting set of values.

Step (1) yields:

| 120.0000 | 112.0000 | 104.0000 | 96.0000 | 104.0000 | 112.0000 |
|----------|----------|----------|---------|----------|----------|
| 120.0000 | | | | | |
| 120.0000 | 112.0000 | 104.0000 | 95.1720 | 104.0000 | 112.0000 |
| 120.0000 | | | | | |
| 120.0000 | 112.0000 | 102.8966 | 95.2494 | 103.6748 | 112.0000 |
| 120.0000 | | | | | |
| 120.0000 | 110.6918 | 102.9186 | 95.2748 | 103.7076 | 111.9114 |
| 120.0000 | | | | | |
| 120.0000 | 112.0000 | 102.9248 | 95.2820 | 103.7174 | 112.0000 |
| 120.0000 | | | | | |
| 120.0000 | 112.0000 | 104.0000 | 95.2840 | 104.0000 | 112.0000 |
| 120.0000 | | | | | |
| 120.0000 | 112.0000 | 104.0000 | 96.0000 | 104.0000 | 112.0000 |
| 120.0000 | | | | | |

Step (2) involves taking the maximum of the values in bold, which is 111.9114, the feature vector value corresponding to dilation at the point (4,4) for scale=2.

Similarly, erosion involves (1) adding the structuring element values from the image pixel values, and (2) taking the minimum of the resulting set of values.

Step(1) yields:

| 120.0000 | 112.0000 | 104.0000 | 96.0000 | 104.0000 | 112.0000 |
|----------|----------|----------|---------|----------|----------|
| 120.0000 |          |          |         |          |          |
| 120.0000 | 112.0000 | 104.0000 | 96.8280 | 104.0000 | 112.0000 |
| 120.0000 |          |          |         |          |          |
| 120.0000 | 112.0000 | 105.1034 | 96.7506 | 104.3252 | 112.0000 |
| 120.0000 |          |          |         |          |          |
| 120.0000 | 113.3082 | 105.0814 | 96.7252 | 104.2924 | 112.0886 |
| 120.0000 |          |          |         |          |          |
| 120.0000 | 112.0000 | 105.0752 | 96.7180 | 104.2826 | 112.0000 |
| 120.0000 |          |          |         |          |          |
| 120.0000 | 112.0000 | 104.0000 | 96.7160 | 104.0000 | 112.0000 |
| 120.0000 |          |          |         |          |          |
| 120.0000 | 112.0000 | 104.0000 | 96.0000 | 104.0000 | 112.0000 |
| 120.0000 |          |          |         |          |          |

Step (2) involves taking the minimum of the values in bold, which is 96.7160, the feature vector value corresponding to erosion at the point (4,4) for scale=2. Similarly, the values for the other scales are determined by considering bigger/smaller structuring elements as the case may be. For the degenerate case of zero scale, the pixel value at (4,4) is taken "as is", which is 96. Thus, the feature vector is formed for the point (4,4) by concatenating the "m" erosions, "m" dilations and the zero scale value yielding (2m+1) values for that point. Here "m" denotes the maximum value of the scale factor. The same process is performed at other points on the grid to form the feature vector. A typical feature vector size is 50 values for the image; the feature vector containing the most distinguishing features for the image.

Returning to FIG. 3, a database of known images is built with the feature vector for a plurality of image. When an unknown image is analyzed, the same process is performed to determine its feature vector. This process includes determining the principal curvature map, modulating the structuring element based on the principal curvature map, and creating the feature vector for the unknown image. The feature vector of the unknown image is compared to the feature vectors in the database to determine the minimal distance measure, i.e. the closest match. A typical distance measure is the sum of the absolute differences between the feature vector of the unknown image and each feature vector in the database. Another distance measure commonly used is the Euclidean distance measure, which is a Root Mean Squared difference between the feature vectors. The smallest distance measure gives the closest match.

In summary, a novel technique for classification of face images employing CMM has been discussed. The standard approach for multi-scale morphology is insufficient because all grid points on the image are eroded/dilated by an exactly similar shaped structuring element, for a given scale. The present approach employs curvature information to control the shape of the structuring element employed for morphological operations and is, therefore, superior to the standard approach in terms of classification performance. The increase in computational complexity is offset by superior classification performance.

Although the present invention has been described with respect to preferred embodiments, any person skilled in the art will recognize that changes may be made in form and detail, and equivalents may be substituted for elements of the invention without departing from the spirit and scope of the invention. Many modifications may be made to adapt to a particular situation or material to the teaching of the invention without departing from the essential scope of the invention. Therefore, it is intended that the invention not be limited to the particular embodiments disclosed for carrying out this invention, but that the invention will include all embodiments falling within the scope of the appended claims.

What is claimed is:

1. A method of classifying an image, comprising:
   recording the image in numeric format;
   determining curvature features of the image;
   modulating a structuring element based on the curvature features;
   applying a grid to the image;
   superimposing the structuring element on the grid; and
   formulating a feature vector for the image using a morphology calculation at points on the grid.

2. The method of claim 1, wherein the structuring element is a cylinder.

3. The method of claim 1, wherein the step of determining curvature features of the image includes determining a gradient of intensity variation across pixels of the image.

4. The method of claim 3, wherein the step of determining curvature features of the image further includes applying Gaussian derivative and filtering to the gradient of intensity variation across pixels of the image to form a principal feature map.

5. The method of claim 1, further including:
   storing feature vectors for known images in a database;
   determining a feature vector for an unknown image; and
   comparing the feature vector for the unknown image to feature vectors stored in the database to find a match.

6. The method of claim 5, wherein the step of comparing includes identifying a closest match based on a distance measure.

7. The image classification system of claim 1, further including:
   means for storing feature vectors for known images in a database;
   means for determining a feature vector for an unknown image; and
   means for comparing the feature vector for the unknown image to feature vectors stored in the database to find a match.

8. The image classification system of claim 7, wherein the means for comparing includes means for identifying a closest match based on a distance measure.

9. A method of identifying an unknown image, comprising:
   building a database of known images, each known image having a feature vector;
   determining a feature vector for the unknown image by,
   (a) recording the unknown image in numeric format,
   (b) determining curvature features of the unknown image,
   (c) modulating a structuring element based on the curvature features of the unknown image,
   (d) applying a grid to the unknown image,
   (e) superimposing the structuring element on the grid, and
   (f) formulating the feature vector for the unknown image using a morphology calculation at points on the grid; and comparing the feature vector for the unknown image to feature vectors stored in the database to find a match.

10. The method of claim 9, wherein the structuring element is a cylinder.

11. The method of claim 9, wherein the step of determining curvature features of the image includes determining a gradient of intensity variation across pixels of the image.

12. The method of claim 11, wherein the step of determining curvature features of the image further includes applying Gaussian derivative and filtering to the gradient of intensity variation across pixels of the image to form a principal feature map.

13. The method of claim 9, wherein the step of comparing includes identifying a closest match based on a distance measure.

14. An image classification system, comprising:
   means for recording the image in numeric format;
   means for determining curvature features of the image;
   means for modulating a structuring element based on the curvature features;
   means for applying a grid to the image;
   means for superimposing the structuring element on the grid; and
   means for formulating a feature vector for the image using a morphology calculation at points on the grid.

15. The image classification system of claim 14, wherein the structuring element is a cylinder.

16. The image classification system of claim 14, wherein the means for determining curvature features of the image includes means for determining a gradient of intensity variation across pixels of the image.

17. The image classification system of claim 16, wherein the means for determining curvature features of the image further includes means for applying Gaussian derivative and filtering to the gradient of intensity variation across pixels of the image to form a principal feature map.

18. A image classification method, comprising:
   recording an image in numeric format;
   determining curvature features of the image;
   modulating a structuring element based on the curvature features;
   superimposing the structuring element over the image; and
   formulating a feature vector for the image using a morphology calculation at points on the image.

19. The image classification method of claim 18, wherein the structuring element is a cylinder.

20. The image classification method of claim 18, wherein the step of determining curvature features of the image includes determining a gradient of intensity variation across pixels of the image.

21. The image classification method of claim 20, wherein the step of determining curvature features of the image further includes applying Gaussian derivative and filtering to the gradient of intensity variation across pixels of the image to form a principal feature map.

22. The image classification method of claim 18, further including:
   storing feature vectors for known images in a database;
   determining a feature vector for an unknown image; and
   comparing the feature vector for the unknown image to feature vectors stored in the database to find a match.

23. The image classification method of claim 22, wherein the step of comparing includes identifying a closest match based on a distance measure.

24. A mass storage device including an image classification system, the image classification system comprising the steps of:
   recording an image in numeric format;
   determining curvature features of the image;
   modulating a structuring element based on the curvature features;
   superimposing the structuring element over the image; and
   formulating a feature vector for the image using a morphology calculation at points on the image.

* * * * *